UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

YELLOW WOOL-DYE.

No. 849,690.     Specification of Letters Patent.     Patented April 9, 1907.

Application filed November 6, 1906. Serial No. 342,174. (Specimens.)

*To all whom it may concern:*

Be it known that I, AUGUST LEOPOLD LASKA, doctor of philosophy, chemist, and a resident of 5 Gerberstrasse, Offenbach-on-the-Main, in the Grand Duchy of Hesse, Germany, have invented new and useful Improvements in Yellow Wool Dyestuffs, of which the following is a specification.

My invention relates to the production of yellow wool dyestuffs by combining paratoluidin meta-sulfonic acid ($CH_3.NH_2.SO_3H = 1.4.3$) with pyrazolon derivatives of the general formula:

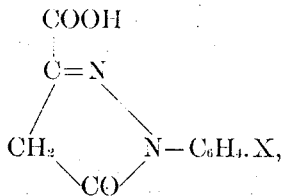

wherein X means a hydrogen atom or a sulfo group. The dyestuffs thus obtained are of excellent fastness to light, surpassing in this point the dyestuffs obtained from isomeric acids.

The following example will show how this new coloring-matter can be produced. The parts are by weight.

Example: 37.4 parts of paratoluidin meta-sulfonic acid and 11.3 parts of calcinated sodium carbonate are dissolved in one hundred and fifty parts of water. The solution is cooled down to 15° centigrade by addition of ice and diazotized with 13.8 parts of sodium nitrite and fifty-seven parts of hydrochloric acid, 20° Baumé. The solution of the diazo compound is poured into a solution of 56.8 parts of 1 parasulfophenyl-5-pyrazolon-3-carbonic acid in about five hundred parts of water and the sufficient quantity of sodium carbonate. After combining is completed the mixture is heated up to 70° centigrade and the dyestuff precipitated by addition of a mineral acid and common salt, filtered, pressed, and dried in the usual manner. It dyes wool from acid-bath lemon-yellow shades.

The combination with phenylpyrazolon-carbonic acid may be carried out in the same manner. These dyestuffs are also very apt for the production of pigment colors.

Now what I claim, and desire to secure by Letters Patent, is the following:

1. The process of manufacturing yellow wool dyestuffs consisting in combining the diazotized paratoluidin meta-sulfonic acid ($CH_3.NH_2.SO_3H-1.4.3$) with pyrazolon derivatives of the general formula:

$$COOH.C_3H_2ON_2.C_6H_4X,$$

wherein X means a hydrogen atom or a sulfo group.

2. As a new article of manufacture the yellow wool dyestuffs, obtained by combining the diazotized paratoluidin meta-sulfonic acid ($CH_3.NH_2.SO_3H = 1.4.3$) with pyrazolon derivatives of the general formula:

$$COOH.C_3H_2ON_2.C_6H_4X,$$

wherein X means a hydrogen atom or a sulfo group, forming yellow powders, dissolving in concentrated sulfuric acid to an orange solution, in water to a yellow one, which is hardly altered by the addition of caustic-soda lye or hydrochloric acid.

In testimony that I claim the foregoing as my invention I have signed my name, in presence of two witnesses, this 23d day of October, 1906.

AUGUST LEOPOLD LASKA.

Witnesses:
   EVA SATTLER,
   OSKAR STANDHARDT.